(12) United States Patent
Noll et al.

(10) Patent No.: US 11,535,228 B2
(45) Date of Patent: Dec. 27, 2022

(54) FILLING LEVEL SENSING DEVICE

(71) Applicant: ZF Active Safety GmbH, Koblenz (DE)

(72) Inventors: Daniel Noll, Andernach (DE); Dennis Wagner, Andernach (DE); Soeren Lehmler, Neuwied (DE)

(73) Assignee: ZF Active Safety GmbH, Koblenz (DE)

( * ) Notice: Subject to any disclaimer, the term of this patent is extended or adjusted under 35 U.S.C. 154(b) by 393 days.

(21) Appl. No.: 16/843,756

(22) Filed: Apr. 8, 2020

(65) Prior Publication Data

US 2020/0331449 A1 Oct. 22, 2020

(30) Foreign Application Priority Data

Apr. 16, 2019 (DE) .......................... 102019205502.8

(51) Int. Cl.
| | |
|---|---|
| *B60T 17/22* | (2006.01) |
| *B60T 11/26* | (2006.01) |
| *F16K 37/00* | (2006.01) |
| *F16K 33/00* | (2006.01) |
| *B60T 17/06* | (2006.01) |

(52) U.S. Cl.
CPC ............. *B60T 17/222* (2013.01); *B60T 11/26* (2013.01); *B60T 17/06* (2013.01); *F16K 33/00* (2013.01); *F16K 37/005* (2013.01)

(58) Field of Classification Search
CPC ....... B60T 17/225; B60T 17/222; B60T 17/06
See application file for complete search history.

(56) References Cited

U.S. PATENT DOCUMENTS 4,168,613 A * 9/1979 Nakagawa .............. B60T 11/22
60/592
2013/0271120 A1 10/2013 Reymann

FOREIGN PATENT DOCUMENTS

| DE | 69427057 T2 | 8/2001 | |
| DE | 10239126 A1 * | 7/2003 | ............ B60T 17/225 |
| DE | 102009023343 A1 | 12/2010 | |
| DE | 112016005298 T5 | 7/2018 | |
| FR | 2824123 A1 * | 10/2002 | ............ B60T 17/221 |
| FR | 3028473 A1 * | 5/2016 | ............ B60T 17/225 |
| JP | 2009040359 A * | 2/2009 | ............ B60T 13/686 |

* cited by examiner

*Primary Examiner* — Melanie Torres Williams
(74) *Attorney, Agent, or Firm* — Robert James Harwood

(57) ABSTRACT

A filling level sensing device for a liquid reservoir, in particular for a compensation tank of a vehicle brake system, includes at least one float, at least one sensor element connected to the at least one float, and at least two sensors for detecting the position of the at least one sensor element. The float may be designed to come into contact with the liquid in the liquid reservoir. At least one of the two sensors may sense a change in the filling level of the liquid reservoir depending on the position of the at least one sensor element relative to the at least two sensors.

20 Claims, 6 Drawing Sheets

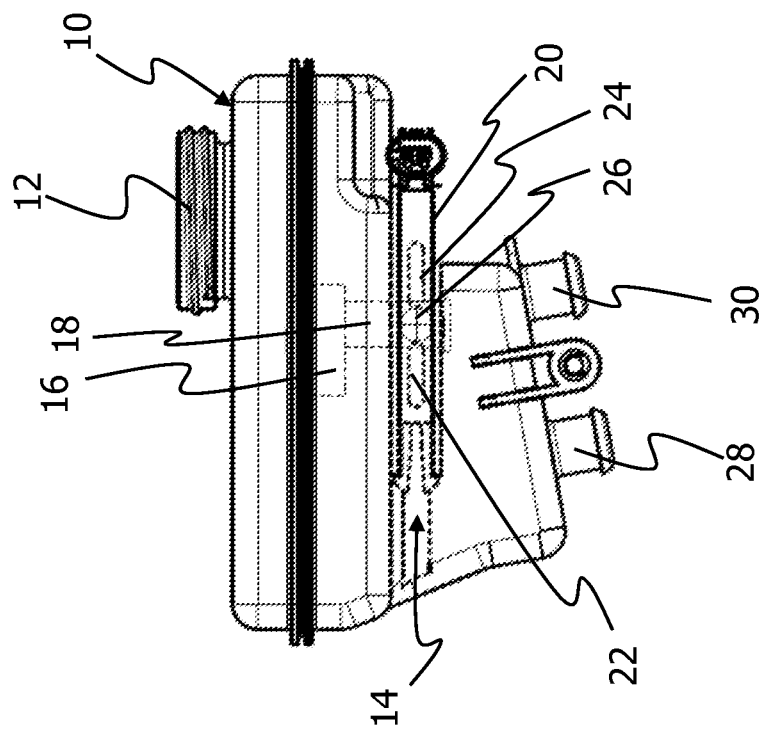
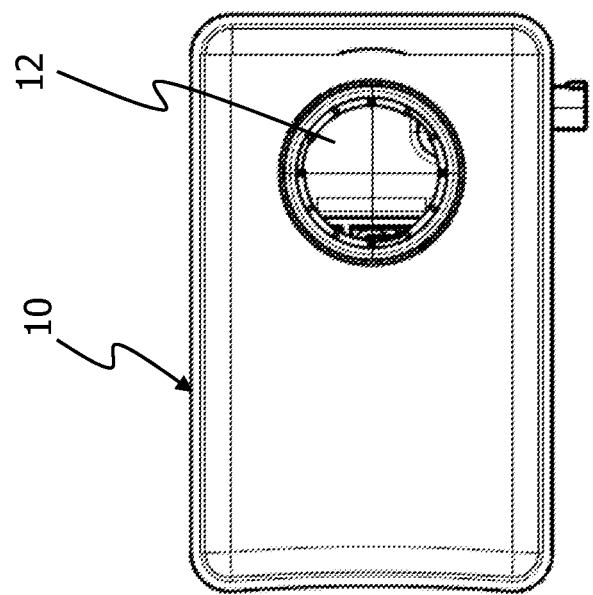
Fig.2
Fig.1

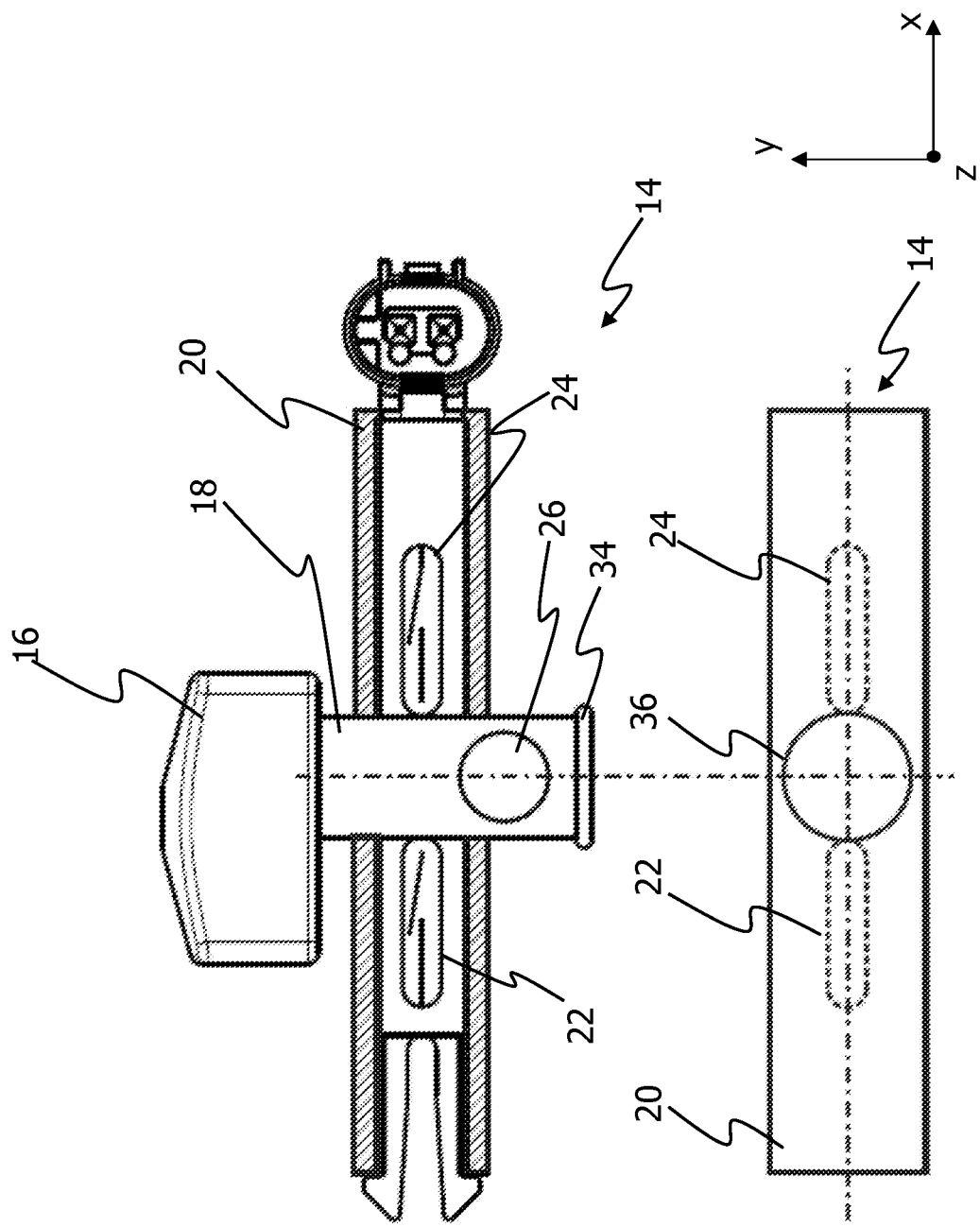

FILLING LEVEL SENSING DEVICE

CROSS-REFERENCE TO RELATED APPLICATION

This application claims priority to German Patent Application No. 102019205502.8, filed Apr. 16, 2019, the disclosure of which is incorporated herein by reference in its entirety.

TECHNICAL FIELD

The present disclosure relates to a filling level sensing device and to a fluid reservoir comprising a filling level sensing device of this kind.

BACKGROUND

Filling level sensing devices are known from the prior art, for example from laid-open patent DE 10 2004 061 357 A1. Laid-open patent DE 10 2004 061 357 A1 discloses a compensation tank which is connected to a guide tube. A float is arranged in a displaceable manner on the guide pipe. The float is fitted with an annular magnet. A tube support which protrudes from the base of the compensation tank and partially concentrically surrounds the guide tube is provided as a stop for the float. A carrier element, to which a switch is fitted, is arranged in the interior of the guide tube.

SUMMARY

One object of the present disclosure is to provide a filling level sensing device which can detect at least two different filling levels in a simple and reliable manner. This object is achieved by a filling level sensing device having the features of claim 1. Advantageous refinements are specified in the dependent claims.

The filling level sensing device according to the disclosure for a liquid reservoir, in particular for a compensation tank of a vehicle brake system, comprises at least one float which is designed to be in contact with the liquid in the liquid reservoir, at least one sensor element which is connected to the at least one float, and at least two sensors for detecting the position of the at least one sensor element. At least one of the sensors senses a change in the filling level in the liquid reservoir depending on the position of the at least one sensor element relative to the at least two sensors.

At least two different filling levels can be detected by the filling level sensing device according to the disclosure. This is advantageous particularly for autonomous vehicles since there is no driver as a superordinate entity for monitoring vehicle systems, such as the brake system, in autonomous vehicles. Signals which represent at least two different filling levels can be generated by the filling level sensing device according to the disclosure based on the change in the position of the at least one sensor element, which change is detected by at least one of the sensors. A change in the position of the at least one sensor element, which change is detected by one of the sensors, can be used, for example, to generate an early warning signal which indicates an existing, but as yet uncritical, loss of liquid in the liquid reservoir. A change in the position of the at least one sensor element, which change is detected by the respectively other sensor, can however be used to generate a warning signal which indicates a critical filling level of the liquid reservoir and warns of the threat of failure of the brake system of the vehicle. A constant filling level or an insignificant loss of liquid can likewise be indicated by at least one of the at least two sensors, wherein no warning signal is necessary in this case.

The at least one sensor element can be displaced relative to the at least two sensors in the vertical direction. The at least two sensors can be installed in a fixed position and detect a relative movement of the at least one sensor element in the vertical direction. The sensor element which is connected to the at least one float can change its vertical position when the filling level of the liquid reservoir changes and as a result the position of the at least one float also changes.

The at least one float can have at least one connecting element. At least one sensor element can be arranged on the at least one connecting element. The sensor element can be of cylindrical or cuboidal design. The connecting element can likewise be of cylindrical design or of rectangular design in cross section. The at least one sensor element can be accommodated in the connecting element. As an alternative, the at least one sensor element can be arranged on an outer surface of the connecting element. This outer surface of the connecting element can face the at least two sensors.

The at least two sensors can be integrated into the at least one liquid reservoir. The at least two sensors can therefore be part of the liquid reservoir. The at least two sensors can be accommodated in a sensor housing. The sensor housing can be arranged in or on the liquid reservoir in a fixed position. The sensor housing can be of elongate design and extend into the liquid reservoir in the horizontal direction. The sensor housing can be connected to the liquid reservoir in a fixed or releasable manner. The sensor housing can have a low structural height. The sensor housing can be inserted into the liquid reservoir together with the sensors. Fastening devices, which interact with corresponding devices on the liquid reservoir, can be provided on the sensor housing. A device of this kind on the liquid reservoir can be, for example, a rail which allows the sensor housing to be pushed in. The sensor housing can be entirely or partially accommodated in the liquid reservoir. It is conceivable for a section of the sensor housing to protrude out of the liquid reservoir.

There can be a guide for the at least one connecting element in order to guide a displacement of the connecting element, together with the at least one sensor element, in the vertical direction. The guide for the at least one connecting element can be formed or fastened, for example, on the liquid reservoir. The guide can be of U-shaped design in cross section, for example. The guide can further be formed on the at least one sensor housing. An opening, into which the connecting element can be inserted and which can guide a relative movement of the connecting element relative to the sensor housing, can be formed in the sensor housing.

The at least one sensor element can be designed such that it produces a magnetic field. The at least one sensor element can be, for example, a permanent magnet. The sensor element, which is designed as a permanent magnet, can be accommodated in the connecting element or arranged on the connecting element.

The at least two sensors can react to the magnetic field which is produced by the at least one sensor element. If the magnetic field moves closer to the sensors or the magnetic field moves away from the sensors, this can be detected by at least one of the two sensors. The magnetic field which is detected by at least one of the sensors or the magnetic effect of the sensor element can change on account of a change in the vertical position of the sensor element relative to the at least two sensors. The larger the distance between the at least one sensor element and the at least two sensors, the weaker the magnetic effect of the at least one sensor element on the at least two sensors.

The magnetic sensitivity of the at least two sensors can differ. One of the two sensors can have a higher sensitivity to the magnetic field than the respectively other sensor. One of the sensors can therefore detect a change in the magnetic field, which is produced by the sensor element, more readily than the other sensor. In particular, the sensor which is more sensitive to changes in the magnetic field can detect the magnetic field over a greater distance than the less sensitive sensor. In other words, there are states in which the less sensitive sensor no longer detects the magnetic field but the more sensitive sensor does so.

Each of the at least two sensors can be connected to an electrical circuit. The two electrical circuits can be connected to an electronic control unit. The electronic control unit can register the changes in state by means of the electrical circuits on account of the position of the sensor element, which position is detected by the sensors, and generate and output signals based on these changes in state.

At least one of the at least two sensors can be a switch which can change its switching state depending on the magnetic field which is produced by the at least one sensor element. Both sensors can also be switches. The sensors can interrupt or close the electrical circuit which is connected to them on the basis of the change in their switching state. The electronic control unit which is connected to the electrical circuits can detect the change in the state of the electrical circuits and output signals, which can indicate a loss of liquid in the liquid reservoir, based on said change. The electronic control unit can output an early warning signal, which specifies a loss of liquid in the liquid reservoir, on the basis of the change in the switching state of the less sensitive sensor. If the more sensitive sensor changes its switching position, the electronic control unit can output a warning signal which warns of the imminent failure of the brake system of the vehicle. A change in the switching state of the magnetically more sensitive sensor can accordingly correspond to a relatively large loss of liquid, for example on account of a relatively large leak. In particular, the switches can be so-called reed switches.

The at least two sensors can be arranged next to one another in the vertical direction. The at least two sensors can be arranged at the same height position in the vertical direction. Looking at the position of the at least two sensors in a coordinate system with an x-, y- and z-axis, wherein the z-axis corresponds to the vertical direction, the position of the at least two sensors can have the same coordinate value in the direction of the z-axis. The at least two sensors can be arranged offset in relation to one another in the direction of the x-axis, that is to say in the horizontal direction. The at least one connecting element, on which the sensor element is arranged, can be arranged between the at least two sensors and can be displaced relative to the at least two sensors in the vertical direction.

The at least one connecting element can have at least one travel limiting element. The at least one travel limiting element can be a projection. The projection can extend away from the connecting element in the radial direction. The travel limiting element can be configured such that it can be applied against the at least one sensor housing in order to limit the relative movement of the connecting element relative to the sensor housing. The travel limiting element can therefore define an upper end position of the float. In spite of the buoyancy force of the float, on account of the travel limiting element, the float cannot rise further when the at least one float assumes its upper end position in which the travel limiting element bears against the sensor housing. In its upper end position, the float can be submerged in the liquid in the liquid reservoir. This can be the case, for example, when the liquid reservoir has been filled after an initial filling operation or during refilling as part of a service when servicing the vehicle.

The present disclosure further relates to a liquid reservoir comprising a filling level sensing device in accordance with the above-described type.

BRIEF DESCRIPTION OF THE DRAWINGS

Exemplary embodiments of the disclosure will be described below with reference to the appended, schematic figures, in which:

FIG. 1 shows a first view of a liquid reservoir comprising a filling level sensing device;

FIG. 2 shows a second view of a liquid reservoir comprising a filling level sensing device;

FIG. 6 shows a first view of a guide of the filling level sensing device according to one exemplary embodiment;

FIG. 7 shows a second view of a guide of the filling level sensing device according to another exemplary embodiment;

DETAILED DESCRIPTION

Figure 3:
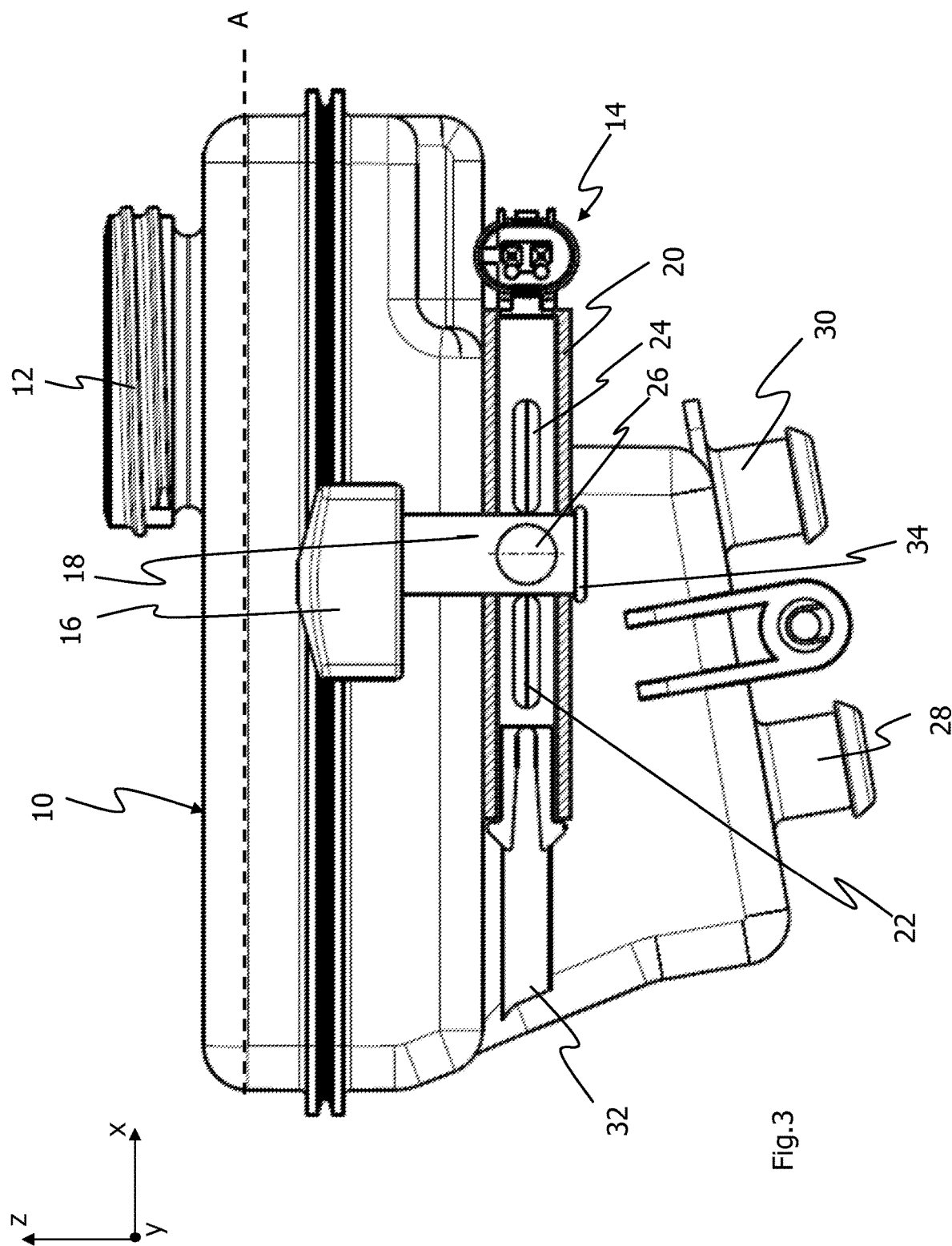
FIG. 3 shows a view of a liquid reservoir with a first filling level which is detected by the filling level sensing device.

FIG. 1 shows a plan view of the liquid reservoir 10 which has a filling opening 12. The liquid reservoir 10 is a compensation tank of a vehicle brake system. The liquid reservoir 10 accordingly contains a brake fluid which can be supplied to the braking circuits of a brake system of a vehicle.

FIG. 2 shows a side view of the liquid reservoir 10, in which the filling level sensing device 14 is shown. The filling opening 12 can be seen on the top side of the liquid reservoir 10. The filling level sensing device 14 has a float 16, illustrated using dashed lines. The float 16 is in contact with the liquid which is contained in the liquid reservoir 10. The float 16 can be submerged in the liquid or float on the surface of the liquid depending on the filling level of the liquid in the liquid reservoir 10.

The float 16 has a connecting element 18 which is likewise illustrated using dashed lines in FIG. 2. The connecting element 18 is guided in the liquid reservoir 10 such that it can be displaced relative to a sensor housing 20 in the vertical direction. Two sensors 22 and 24, which detect the position of a sensor element 26 which is arranged on the connecting element 18, are arranged in the sensor housing 20. If the position of the float 16 changes, the position of the connecting element 18 which is connected to the float 16 and therefore also the position of the sensor element 26 relative to the sensors 22 and 24 also change.

The liquid reservoir 10 has two outlet nozzles 28 and 30 which are provided on the bottom side of the liquid reservoir 10. The outlet nozzles 28 and 30 are of tubular design and each have an encircling projection at their end.

FIG. 3 shows a side view of the liquid reservoir 10 and the filling level sensing device 14 which is fitted to it. For the purpose of illustrating the design of the filling level sensing device 14, the elements and components of the filling level sensing device 14 are illustrated using solid lines in FIG. 3, even though at least the float 16, the connecting element 18 and at least one section of the sensor housing 20 are arranged within the liquid reservoir 10. A coordinate system with an x-axis, a y-axis and a z-axis is also included in FIG. 3, reference being made to said coordinate system for describing the liquid reservoir 10 and the filling level sensing device 14. The z-axis runs vertically, whereas the x-axis runs horizontally.

The sensors 22 and 24 are arranged in the common sensor housing 20. The sensor housing 20 can be fitted to the liquid reservoir 10. The sensor housing 20 is of elongate design and extends in the liquid reservoir 10 in the x-direction. The sensor housing 20 has a relatively low structural height in the z-direction. The connecting element 18 extends in the X-direction between the two sensors 22 and 24. Accordingly, the sensor element 26 which is arranged on the connecting element 18 is also arranged between the two sensors 22 and 24 as seen in the x-direction. The connecting element 18 is guided on the sensor housing 20 in a displaceable manner in the vertical direction. The guide for the connecting element 18 is formed between the two sensors 22 and 24 on the sensor housing 20. Owing to the guidance on the sensor housing 20, the float 16 and the connecting element 18 are oriented in the vertical direction in the liquid reservoir 10. The float 16 can be displaced, together with the connecting element 18, relative to the sensor housing 20 in the z-direction, that is to say in the vertical direction.

A rail 32 can be provided on the liquid reservoir 10, for example on an inner wall of the liquid reservoir 10. The rail 32 can be made to engage with corresponding devices on the sensor housing 20 and therefore allow the sensor housing 20 to be pushed into the liquid reservoir 10. The rail 32 can hold the sensor housing 20 and therefore the connecting element 18 and the float 16 in a predetermined position and location.

The connecting element 18 has a travel limiting element 34 at its end which is opposite the float 16. The travel limiting element 34 is designed in the form of an encircling projection which extends away from the connecting element 18 in the radial direction. The travel limiting element 34 can be applied against the sensor housing 20 in order to limit a displacement of the float 16 and of the connecting element 18 relative to the sensor housing 20 in the z-direction, or rather in the vertical direction. In this way, an upper end position of the float 16 can be defined by the travel limiting element 34. In other words, the float 16, together with the connecting element 18, cannot be moved further upward in the z-direction on account of the travel limiting element 34 in spite of its buoyancy in the liquid in the z-direction, when the surface of the liquid in the liquid reservoir 10 lies above the float 16 in the z-direction. The float 16 can also be submerged in the liquid in the liquid reservoir 10.

In FIG. 3, the surface of the liquid in the liquid reservoir 10 is at the filling level mark A, that is to say above the float 16. The liquid in the liquid reservoir 10 is at this filling level, for example, after an initial filling operation or after refilling as part of a service when servicing the vehicle. The float 16 is accordingly submerged in the liquid in the liquid reservoir 10 because the travel limiting element 34 defines an upper end position of the float 16 and prevents further rising of the float 16 due to abutment against the sensor housing 20.

The sensors 22 and 24 are arranged together in the sensor housing 20. The connecting element 18, to which the sensor element 26 is fitted, extends between the two sensors 22 and 24. Owing to the guidance of the connecting element 18 on the sensor housing 20, the sensor element 26 can change its position in the vertical direction relative to the sensors 22 and 24 when the vertical position of the float 16 and of the connecting element 18 changes on account of a change in the filling level of the liquid in the liquid reservoir 10. The sensors 22 and 24 are arranged at the same height in the direction of the z-axis or in the vertical direction, that is to say the positions of the two sensors 22 and 24 have the same coordinate value on the z-axis. However, the two sensors 22 and 24 are offset in relation to one another in the direction of the x-axis, that is to say in the horizontal direction, and therefore the connecting element 18 with the sensor element 26 can extend between them.

The sensors 22 and 24 can detect the vertical position (z-direction) of the sensor element 26. The sensor element 26 can generate a magnetic field. The sensor element 26 can be, for example, a permanent magnet. The sensors 22 and 24 can detect, on the basis of the magnetic field which is produced by the sensor element 26, when the position of the at least one sensor element 26 changes on account of a change in the filling level of the liquid reservoir 10. These changes in the magnetic field, which changes are detected by the sensors 22, 24, can be caused by a change in the position of the sensor element 26 and therefore by a change in the position of the float 16 and by the connecting element 18 in the liquid reservoir 10. The sensors 22 and 24 each have a different sensitivity with which they react to a magnetic field. In other words, one of the sensors 22, 24 can respond earlier or more quickly to the magnetic field which is produced by the sensor element 26 than the respectively other sensor 22, 24. On account of the different sensitivities of the sensors 22 and 24, a plurality of different filling levels can be detected by the sensors 22 and 24, even though the sensors 22 and 24 are located in the same position in the z-direction, that is to say the value of the z-coordinate for the two sensors 22 and 24 is the same. In the exemplary embodiment described here, the sensor 22 can react less sensitively to the magnetic field which is produced by the sensor element 26 than the sensor 24.

According to this exemplary embodiment, the sensors 22 and 24 are embodied as switches and are each connected to an electrical circuit. The switches 22 and 24 can change their switching position depending on the magnetic field which is produced by the sensor element 26. Depending on the magnetic field which is produced by the sensor element 26, each of the sensors 22 and 24 can interrupt or close the electrical circuit which is respectively associated with it. Since the switches 22, 24 react with a different sensitivity to changes in the magnetic field which is produced by the sensor element 26, different filling levels of the liquid in the liquid reservoir 10 can be detected by the switches. The switches 22, 24 can react to a magnetic field moving closer or moving away and in response change their switching position or their switching state. In particular, the sensors 22 and 24 can be reed switches.

The two sensors 22, 24 or the two switches have the same switching state in FIG. 3. According to FIG. 3, the two switches 22, 24 are closed, and therefore the electrical circuits which are connected to them are likewise closed.

The electrical circuits of the switches 22, 24 can be connected to a control unit (not shown) which can optionally output a warning signal depending on the filling level which is detected by the switches 22, 24. Since the travel limiting element 34 is in abutment with the sensor housing 20 in FIG. 3, the liquid reservoir 10 is at a high filling level. The float 16 is submerged in the liquid in the liquid reservoir 10. No change in the vertical position of the sensor element 26 is detected by the switches 22 and 24 in a filling state of this kind. The switches 22 and 24 are closed in FIG. 3 since the sensor element 26 is located between the switches in the immediate vicinity of the switches 22, 24 or in the x-direction. The electrical circuits which are connected to the switches 22, 24 are also closed on account of the switching state of the switches 22, 24. The switches 22, 24 indicate, on account of the position of the at least one sensor element 26 which is detected by them, that there is enough liquid in the liquid reservoir 10. In this state, no warning signal has to be output by a control unit which is connected to the electrical circuits.

Figure 4:
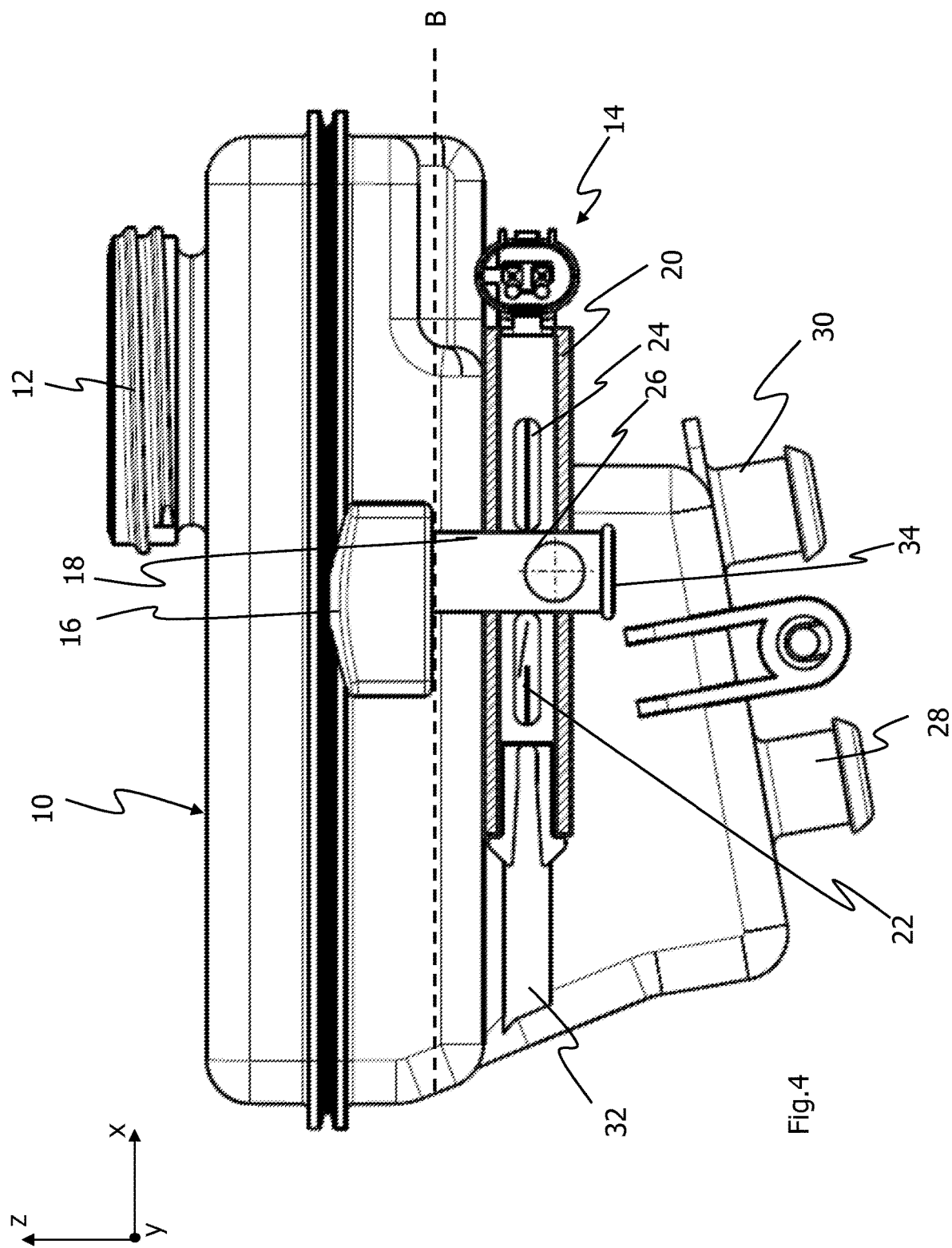
FIG. 4 shows a view of a liquid reservoir with a second filling level which is detected by the filling level sensing device.

In FIG. 4, the filling level of the liquid in the liquid reservoir 10 has fallen to filling level mark B. The float 16 floats on the surface of the liquid in the liquid reservoir 10 and has moved, together with the connecting element 18 and the sensor element 26 which is fitted on it, downward relative to the sensor housing 20, which is fixed in position and comprises the two sensors 22 and 24, in the vertical direction (z-axis). The travel limiting element 34 is no longer in abutment with the sensor housing 20, but rather is at a distance from the sensor housing 20 in the z-direction. The sensor 22 which is less sensitive to the magnetic field of the sensor element 26 has changed its switching state in FIG. 4 based on the change in the vertical position of the sensor element 26. The switch 22 is opened and therefore interrupts the electrical circuit which is connected to it. The interruption in the electrical circuit which is connected to the switch 22 can be detected by the electronic control unit. The electronic control unit can output an early warning signal, which indicates a loss of liquid in the liquid reservoir 10, based on the detected change in the switching state of the switch 22. In contrast to the less sensitive sensor 22, the sensor 24 which is more sensitive to the magnetic field of the sensor element 26 remains closed.

Figure 5:
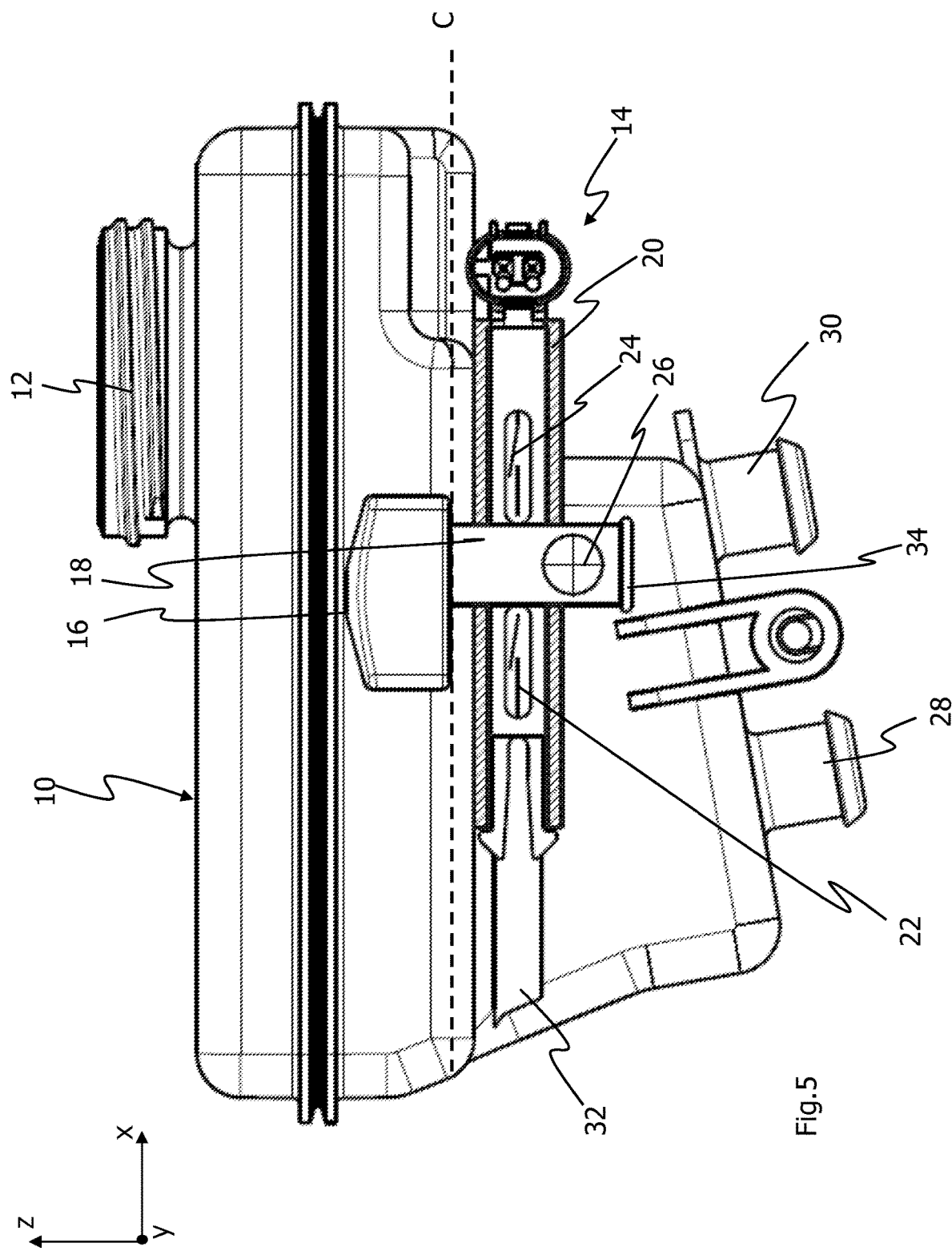
FIG. 5 shows a view of a liquid reservoir with a third filling level which is detected by the filling level sensing device.

In FIG. 5, the filling level in the liquid reservoir 10 has fallen to filling level mark C. On account of the drop in filling level, the float 16 has also dropped once again in the vertical direction and the connecting element 18 and the sensor element 26 have also dropped with it. Owing to the change in the position of the float 16, the sensor element 26 which is connected to the float 16 by means of the connecting element 18 has moved further away from the sensors 22 and 24. On account of this greater distance in the z-direction, the magnetically more sensitive sensor 24 has now also changed its switching state and interrupted the electrical circuit which is connected to it. Therefore, both switches 22 and 24 are open in FIG. 5. The change in the switching state of the switch 24 which is more sensitive to the magnetic field of the sensor element 26 and the interruption in the electrical circuit which is connected to the switch 24 are detected by the electronic control unit. On account of this additional change in the switching state of the switch 24, the electronic control unit (not shown) can output a warning signal which indicates a critical loss of liquid in the brake system of the vehicle and warns of a threat of failure of the brake system.

FIG. 6 shows a partial sectional view of the filling level sensing device 14, in which partial sectional view the sensor housing 20 is shown in cross section. The sensors 22 and 24 are arranged in the sensor housing 20. The connecting element 18, which can be displaced in relation to the two sensors 22 and 24, which are fixed in position, in the vertical direction, is arranged between the sensors 22 and 24 in the x-direction. The connecting element 18 is guided on the sensor housing 20 in a displaceable manner and is of substantially cylindrical design. The connecting element 18 is connected to the float 16 and has the sensor element 26. The sensors 22 and 24 are each connected to an electrical circuit. In addition, the travel limiting element 34 is present at that end of the connecting element 18 which is opposite the float 16.

The sensors 22 and 24 can be inserted, together with the sensor housing 20, into the liquid reservoir 10 and can be connected to the liquid reservoir 10. By way of example, the sensor housing 20 can be pushed into the liquid reservoir 10. It is likewise conceivable for the filling level sensing device 14 to be able to be inserted into the liquid reservoir 10 as a unit, that is to say the sensor housing 20 with the sensors 22 and 24, the float 16 and the connecting element 18.

FIG. 7 shows a plan view of the sensor housing 20. The sensors 22, 24 are illustrated using dashed lines in FIG. 7. An opening 36, which forms the guide for the connecting element 18, can be seen on the sensor housing 20 between the sensors 22 and 24 in the x-direction. The connecting element 18 can be inserted into the opening 36.

Figures 8, 9:
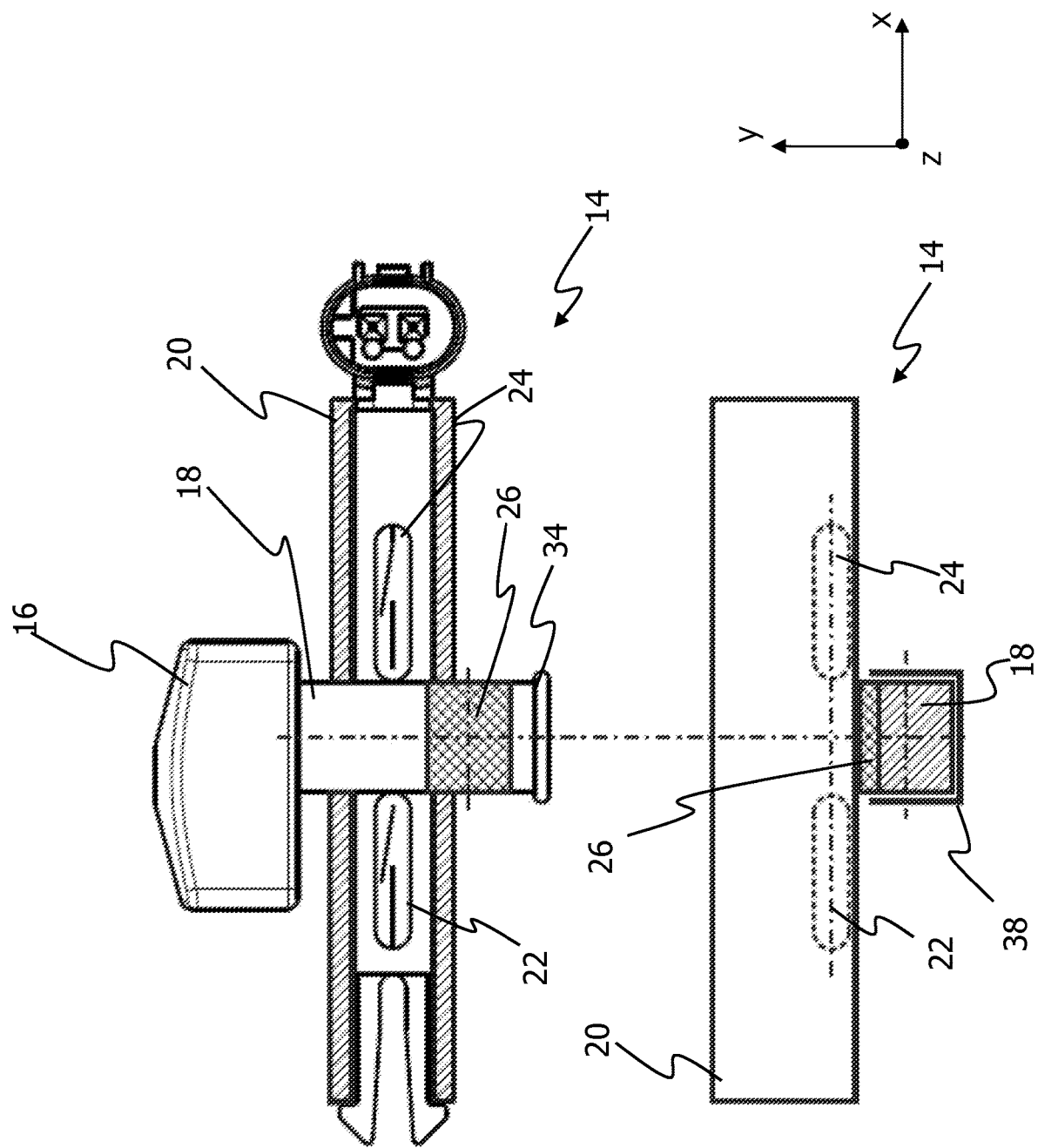
FIG. 8 shows a first view of a guide of the filling level sensing device according to yet another exemplary embodiment.
FIG. 9 shows a first view of a guide of the filling level sensing device according to yet another exemplary embodiment.

FIG. 8 shows a view of a filling level sensing device 14 according to a further exemplary embodiment. The major difference from the filling level sensing device 10 described above with respect to FIGS. 6 and 7 is the design or arrangement of the sensor element 26. The differences between the two embodiments are clear from FIG. 9 in particular.

The sensor housing 20 in which the sensors 22 and 24 are arranged can be seen in FIG. 9. The connecting element 18 is arranged or guided, together with the sensor element 26, outside the sensor housing 20. The connecting element 18 is guided in a guide 38 which is of U-shaped design in cross section. The guide 38 can be formed by a cutout on the liquid reservoir 10. The sensor element 26 is fitted to the outside of the connecting element 18, which has a rectangular cross section, on a surface of the connecting element 18 that faces the sensor housing 20. Therefore, the sensor element 26 is also arranged offset in relation to the sensors 22 and 24 in the y-direction. The sensor element 26 is located substantially between the two sensors 22 and 24 in the x-direction.

Owing to the different magnetic sensitivities of the two sensors 22 and 24, the sensors 22 and 24 can be arranged in the same vertical position (z-axis) and can be accommodated in the common sensor housing 20, which can be pushed into the fluid reservoir, of low structural height and nevertheless detect at least two different filling levels.

What is claimed is:

1. A filling level sensing device for a liquid reservoir, in particular for a compensation tank of a vehicle brake system, comprising:
   at least one float which is designed to come into contact with the liquid in the liquid reservoir,
   at least one sensor element which is connected to the at least one float, the at least one sensor element producing a magnetic field, and
   at least two sensors for detecting the position of the at least one sensor element, the at least two sensors reacting to the magnetic field which is produced by the at least one sensor element, one sensor of the at least two sensors having a higher magnetic sensitivity than the respectively other sensor, wherein at least one of the sensors senses a change in the filling level of the liquid reservoir depending on the position of the at least one sensor element relative to the at least two sensors.

2. The filling level sensing device as defined in claim 1, wherein the at least one sensor element can be displaced relative to the at least two sensors in the vertical direction.

3. The filling level sensing device as defined in claim 1, wherein the at least one float has at least one connecting element on which the at least one sensor element is arranged.

4. The filling level sensing device as defined in claim 3, wherein there is a guide for the at least one connecting element, which guide guides a displacement of the connecting element in the vertical direction.

5. The filling level sensing device as defined in claim 1, wherein each of the at least two sensors is connected to an electrical circuit.

6. The filling level sensing device as defined in claim 1, wherein at least one of the at least two sensors is a switch which changes its switching state depending on the magnetic field which is produced by the at least one sensor element.

7. The filling level sensing device as defined in claim 1, wherein the at least two sensors are arranged at the same height in the vertical direction.

8. The filling level sensing device as defined in claim 1, wherein the at least two sensors are arranged in a sensor housing which can be connected to the liquid reservoir.

9. The filling level sensing device as defined in claim 8, wherein the sensor housing has a guide for at least one connecting element on the at least one float in order to guide a movement of the at least one connecting element relative to the sensor housing in the vertical direction, the at least one sensor element being arranged on the at least one connecting element.

10. The filling level sensing device as defined in claim 9, wherein the at least one connecting element has at least one travel limiting element.

11. The filling level sensing device as defined in claim 9, wherein the at least two sensors can be connected to a control unit.

12. A filling level sensing device for a liquid reservoir, in particular for a compensation tank of a vehicle brake system, comprising:

at least one float which is designed to come into contact with the liquid in the liquid reservoir, at least one sensor element which is connected to the at least one float, and at least two sensors for detecting the position of the at least one sensor element, the at least two sensors being arranged at the same height in the vertical direction, wherein at least one of the sensors senses a change in the filling level of the liquid reservoir depending on the position of the at least one sensor element relative to the at least two sensors.

13. The filling level sensing device as defined in claim 12, wherein the at least one sensor element can be displaced relative to the at least two sensors in the vertical direction.

14. The filling level sensing device as defined in claim 12, wherein the at least one float has at least one connecting element on which the at least one sensor element is arranged.

15. The filling level sensing device as defined in claim 14, wherein there is a guide for the at least one connecting element, which guide guides a displacement of the connecting element in the vertical direction.

16. The filling level sensing device as defined in claim 12, wherein the at least one sensor element produces a magnetic field, the at least two sensors reacting to the magnetic field which is produced by the at least one sensor element.

17. The filling level sensing device as defined in claim 16, wherein at least one of the at least two sensors is a switch which changes its switching state depending on the magnetic field which is produced by the at least one sensor element.

18. The filling level sensing device as claimed claim 12, wherein the at least two sensors are arranged in a sensor housing which can be connected to the liquid reservoir.

19. The filling level sensing device as defined in claim 18, wherein the sensor housing has a guide for at least one connecting element on the at least one float in order to guide a movement of the at least one connecting element relative to the sensor housing in the vertical direction, the at least one sensor element being arranged on the at least one connecting element.

20. The filling level sensing device as defined in claim 19, wherein the at least one connecting element has at least one travel limiting element.

\* \* \* \* \*